Feb. 22, 1955  G. D. LEHMANN  2,702,528
POULTRY FOUNTAIN
Filed July 20, 1953

INVENTOR:
GEORGE D. LEHMANN
By Bruninga and Sutherland
ATTORNEYS.

United States Patent Office 2,702,528
Patented Feb. 22, 1955

2,702,528
POULTRY FOUNTAIN
George D. Lehmann, Chesterfield, Mo.

Application July 20, 1953, Serial No. 368,909

1 Claim. (Cl. 119—77)

This invention relates to poultry fountains.

It has long been recognized that dirty water is a source of disease in poultry. It has also been recognized that domestic fowls have a propensity for roosting on top of almost any flat surface, for standing in their drinking water and for scratching dirt therein.

Various solutions for these problems have been attempted in the past. In some fountains, the basin from which the fowl drinks is covered over except for a small hole through which the fowl can reach the water. In others, a conical roof is provided over the whole of the fountain, supported by a cage-like arrangement of wires. All of these devices, however, suffer from the disadvantages of being difficult to manufacture and use, and not as effective as may be desired.

One of the objects of this invention is to provide a poultry fountain of the barometric feed type wherein dirt of any description on the top and sides of the container will neither drop nor wash into the drinking water.

Another object of this invention is to provide such a fountain in which fowls will not stand, into which their droppings do not fall and into which it is difficult for the fowls to scratch dirt.

Still another object of this invention is to provide such a device which is simple to manufacture and use, and is cheap and effective.

Other objects will become apparent to those skilled in the art in the light of the following disclosure and accompanying drawing.

In accordance with this invention, generally stated, a poultry fountain is provided in which a basin of a height such that poultry can conveniently drink therefrom is surmounted by a reservoir, the body of which is provided with a peripheral skirt which overhangs and extends beyond the perimeter of the basin. The reservoir slopes inwardly and downwardly between the skirt and the basin in such a way as to be protected by the skirt from dirt and in such a way as to discourage any fowl from trying to stand or sit in the basin but, at the same time, to permit free access of a number of fowls to the basin for drinking purposes.

In the drawing, Figure 1 is a view in side elevation of a poultry fountain constructed in accordance with one illustrative embodiment of this invention;

Figure 1:
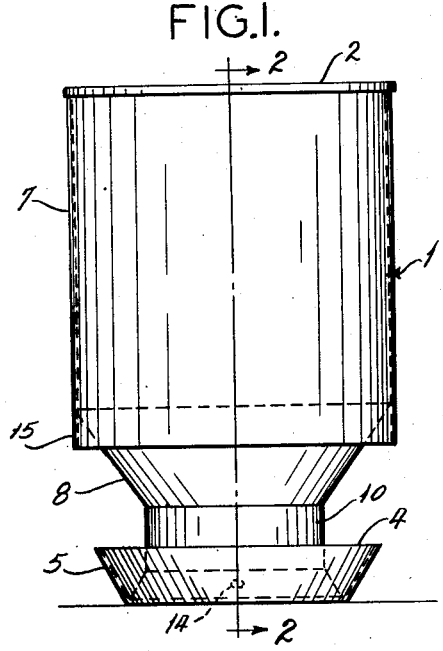
Figure 2:
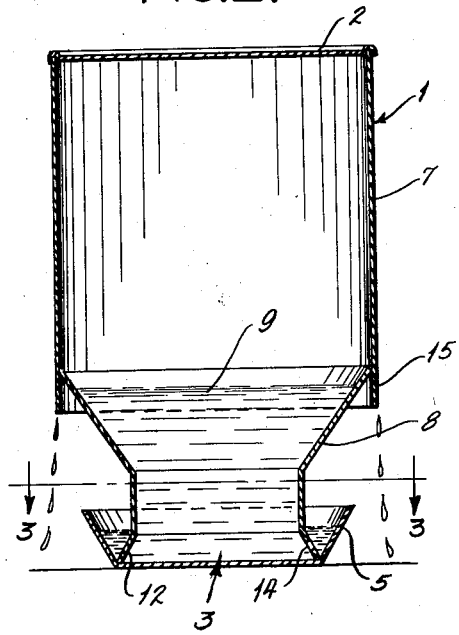
Figure 2 is a sectional view taken along the line 2—2 of Figure 1.
Figure 3:
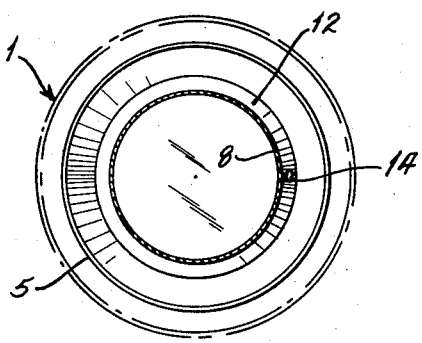
Figure 3 is a sectional view taken along the line 3—3 of Figure 2.
Figure 4:
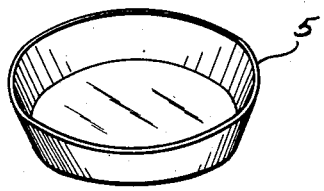
Figure 4 is a view in perspective of the basin of the device shown in Figures 1 through 3.

Referring now to the drawing for an illustrative embodiment of this invention, reference numeral 1 represents a reservoir. The reservoir 1, in feeding position as shown in Figures 1 through 3, has an upper closed end 2 and a lower open end 3. The open end 3 rests in a basin 4. The basin 4 may be a shallow, circular, open pan the side 5 of which in practical application is in the neighborhood of two inches high.

The reservoir in the illustrative embodiment shown has the general shape of a well-known type of milk can, with a cylindrical body 7, an inwardly sloping shoulder 8, a straight neck 10 and an outwardly flaring mouth section 12.

The body 7 of the reservoir is of greater diameter than the basin 4, while the lowermost edge of the mouth 12 of the reservoir is slightly smaller than the bottom of the basin, so that the reservoir rests on the bottom of the basin. A small hole 14 in the side of the mouth section 12 above the lowermost edge thereof permits water 9 to feed from the reservoir.

The reservoir 1 differs from a milk can in a very important particular. It is provided around the periphery of the body 7, at its junction with the shoulder 8, with a skirt 15. The skirt 15 depends from the body 7, free of the shoulder 8, for a distance sufficient to insure that any water or dirt falling therefrom will not, even in a moderately heavy wind, be deflected into the basin 4. At the same time, the skirt extends sufficiently close to the upper edge of the side 5 of the basin 4 to discourage a fowl from sitting or standing in the basin, as has been explained heretofore. This overhang of the skirt also keeps the fowls far enough from the basin to make difficult their scratching dirt into the water.

The skirt need be only about one-half inch long, if the shoulder slopes inwardly sharply, so far as the run-off of water is concerned. However, to serve its "fowl-guarding" function, it may be given any desired additional length, as long as there is room between the bottom of the skirt and the top of the basin to allow fowls access to the water.

To fill the fountain and put it into operation, the reservoir is inverted, with its closed end 2 down, and filled with water. The basin 4 is put over the mouth of the reservoir and the whole assemblage turned over to its feeding position.

If fowls roost on top of the reservoir, as they are wont to do, their droppings will be washed by rain down the sides of the body 7 and off the lower edge of the skirt 15 onto the ground, without contaminating the water in the basin 4. In the absence of the skirt, the dirty water follows the sides even of a steep-sided, hopper-shaped reservoir, and runs into the drinking water.

Various modifications of this invention within the scope of the appended claims will become apparent to those skilled in the art in the light of the foregoing disclosure. For example, a bail may be attached to the reservoir 1. The skirt may be given an outward flare, although this is not necessary if the body of the reservoir is of sufficiently large size compared with the basin. The outwardly-flaring skirt is, in fact, not preferred, for several reasons, among which are that it is more difficult to manufacture and it tends to slow the run-off of the water, which increases the possibility of the wind's driving droplets from the skirt into the basin. The basin and the reservoir may be made in various shapes other than those of the illustrative embodiment as long as the edge of the open top of the basin is inboard of the skirt throughout its periphery.

Thus it can be seen that a poultry fountain is provided which is simple, cheap, easy to manufacture and use, and effective to keep the drinking water clean.

Having thus described the invention, what is claimed and desired to be secured by Letters Patent is:

A barometric feed poultry fountain comprising a substantially circular basin having a bottom, a side, and an open top; a cylindrical reservoir resting upon but unsecured to the bottom of said basin, said reservoir having an airtight upper end, a vertical body, an inwardly sloping shoulder below said body, a vertical neck below said shoulder and a downwardly, outwardly-flaring bottom-opening mouth section below said neck, said mouth section having at least one hole extending above its lowermost edge, said hole being of a relatively small diameter as compared with the diameter of the mouth opening, the lowermost edge of the mouth resting upon the bottom of the basin closely adjacent the side, and the neck extending above the side, and a skirt integral with and depending from the body throughout the periphery thereof, said skirt extending free of the shoulder and outboard of the periphery of the open top of the basin, said skirt being spaced above the top of said basin a distance sufficient to permit a fowl to insert its head between said skirt and the upper edge of said basin.

References Cited in the file of this patent

UNITED STATES PATENTS

| | | |
|---|---|---|
| D. 4,542 | Van Gaasbeek | Dec. 27, 1870 |
| 1,200,892 | Shiffer | Oct. 10, 1916 |
| 1,485,469 | Reigel | Mar. 4, 1924 |
| 1,491,317 | Schultz | Apr. 22, 1924 |
| 1,666,322 | West | Apr. 17, 1928 |
| 1,820,835 | Sauvageau | Aug. 25, 1931 |
| 2,602,420 | Peterson | July 8, 1952 |

FOREIGN PATENTS

| | | |
|---|---|---|
| 3,886 | Great Britain | 1909 |